United States Patent [19]
Lai et al.

[11] Patent Number: 5,450,577
[45] Date of Patent: Sep. 12, 1995

[54] ZERO-DEFECT DATA INTEGRITY IN HIGH-CAPACITY TRANSACTION SYSTEMS

[75] Inventors: Wai S. Lai, Holmdel; Charles A. LaPadula, Tinton Falls, both of N.J.

[73] Assignee: AT&T Corp., Murray Hill, N.J.

[21] Appl. No.: 166,481

[22] Filed: Dec. 14, 1993

[51] Int. Cl.⁶ .............................................. G06F 15/40
[52] U.S. Cl. .................. 395/182.13; 371/2.1; 395/650; 395/439; 395/493
[58] Field of Search ............ 395/575, 600, 650; 371/12; 364/268.9; 379/10, 11, 34, 112, 113, 279

[56] References Cited

U.S. PATENT DOCUMENTS

| | | | |
|---|---|---|---|
| 5,065,311 | 11/1991 | Masai et al. | 364/200 |
| 5,175,866 | 12/1992 | Childress et al. | 455/8 |
| 5,201,044 | 4/1993 | Frey, Jr. et al. | 395/575 |
| 5,247,664 | 9/1993 | Thompson et al. | 395/600 |
| 5,317,731 | 5/1994 | Dias et al. | 395/600 |
| 5,333,314 | 7/1994 | Masai et al. | 395/600 |

Primary Examiner—Robert W. Beausoliel, Jr.
Assistant Examiner—Stephen C. Elmore
Attorney, Agent, or Firm—Jeffrey M. Weinick

[57] ABSTRACT

A failure rate independent system for achieving zero defect data integrity in a computer transaction system is disclosed. The system receives events from an event generator and stores the raw events to disk. Structural information relating events to transactions is not stored on disk. Data which is lost after a system failure is reconstructed from the raw events during recovery. Transaction processing capacity is increased by trading off the continual updating of disk stored events and associated structural information for the post recovery reconstruction of structural information. As a result, zero defect data integrity is achieved at minimum processing cost.

37 Claims, 5 Drawing Sheets

ZERO-DEFECT DATA INTEGRITY IN HIGH-CAPACITY TRANSACTION SYSTEMS

FIELD OF THE INVENTION

This invention relates generally to transactional computer systems for the processing of data. More particularly, the invention relates to a failure rate independent system for achieving zero defect data integrity in a high capacity transaction system.

BACKGROUND OF THE INVENTION

Generally, a transactional computer system receives, processes and stores data. The system may also transmit data for further processing. During processing, data stored in memory of the transaction system will be lost if there is a failure that brings the system down, e.g., a processor failure.

A transaction system has four primary performance measures: capacity, latency, data integrity, and availability. As the transaction volume increases, it is critical that a high data integrity objective be maintained since even a very small fraction of data loss can result in the absolute loss of a relatively large number of transactions. However, the additional processing required to attain this goal can have significant impacts on the other performance measures. In one type of transaction system, during the lifetime of each transaction, a series of several events containing raw data related to the transaction is produced by an event generator and received by the transaction system. When the last event is received, a record for the transaction is generated by the transaction system. This record is then forwarded to another system, a record collector, for further processing. Thus, there are three primary stages in the flow of data through the transaction system: event receiving, record formatting, and record forwarding.

Traditionally, two data storage techniques have been used to ensure data integrity. The first is to store records after they have been formatted. However, in this strategy, if a failure occurs, events which have not yet been formatted into records are lost. This method is used to reduce processing time and to conserve disk space since a record is typically much smaller than the total size of all the events related to the record.

As technology has progressed, inexpensive disk storage has become more readily available. A second technique improves upon the first by saving events. However, in this technique, events are stored on disk only after they have been assembled and correlated to their transactions. Thus, in addition to storing the raw events, the structure of the events in relation to the transactions gets stored as well. Such disk-stored structural information is useful to simplify the reformatting of records upon system recovery after a failure. However, the storing of raw events in conjunction with structural information consumes processing resources, and the amount of processor time required by this method can become excessive as transaction volume increases. For example, the same event may be written to disk multiple times. This is likely because for every transaction that has received a new event since the last disk update, all events belonging to the transaction get written to disk to maintain the structural relationship.

In high throughput systems, the processor must be utilized mainly for transaction processing. Data integrity schemes present additional demands on processor utilization which reduce the capacity of the system. To the contrary, these demands are overhead processing costs.

SUMMARY OF THE INVENTION

In a high throughput system, failure rates may be low. However, when they occur, large amounts of data may be lost during each failure. A data integrity scheme which presents low overhead during normal processing is desirable. Since failure rates are generally low, a scheme which results in larger processing demands upon recovery after a failure is acceptable. Thus, transaction processing under normal conditions can be increased by accepting a somewhat higher processor overhead during recovery after a failure. The present invention is such a system.

All events received by the transaction system are stored both on a disk and in memory: on disk to prevent memory loss due to failure, and in memory to facilitate processing with minimal latency. All events remain on disk until their corresponding records have been generated, delivered to, and confirmed by the record collector.

In the event of a transaction system failure, all events stored in processor memory will be lost. Also lost will be any records generated but not yet delivered to the record collector. In the proposed design, such loss will be recovered by retrieving the events from the disk and reconstructing the lost records.

To facilitate this post-recovery reconstruction of records, each event is tagged with an ID upon its arrival from the event generator. The state of each event is marked with its status, and is periodically saved on disk. The state of each event saved on disk will always lag behind the true state of the event, no matter how frequently the save is being done. As a result, in the process of reconstructing records from the saved events after recovery from a total system failure, duplicate records can be produced. However, these duplicates can be identified and eliminated through the use of a block sequence number of a record block.

Since no loss is incurred and all post-recovery duplicate records generated can be eliminated, the frequency of saving the state information is not constrained by the data integrity requirement i.e., it is failure-rate independent. Rather, it is dictated by the efficient use of disk space available for saving events.

Thus, in the proposed design, raw events only are stored on disk, with no structural information. Any records lost after a total system failure are obtained by reconstructing the structure and reformatting the records upon system recovery from the stored raw events. This technique takes advantage of the fact that since system failures are infrequent, a substantial saving in the processing requirement can be realized by trading off the continual updating of the disk-stored events and associated structural information as done previously for the post-recovery only reconstruction of structural information. Furthermore, for a high-volume system, such post-recovery processing can overlap with the process of event-by-event reading from disk and the reception of new events. Consequently, in the present invention there is no availability penalty in bringing up the system after failure.

The present invention provides a failure rate independent zero defect data integrity system in which no data will be lost in the event of a processor failure.

DETAILED DESCRIPTION

Figure 1:
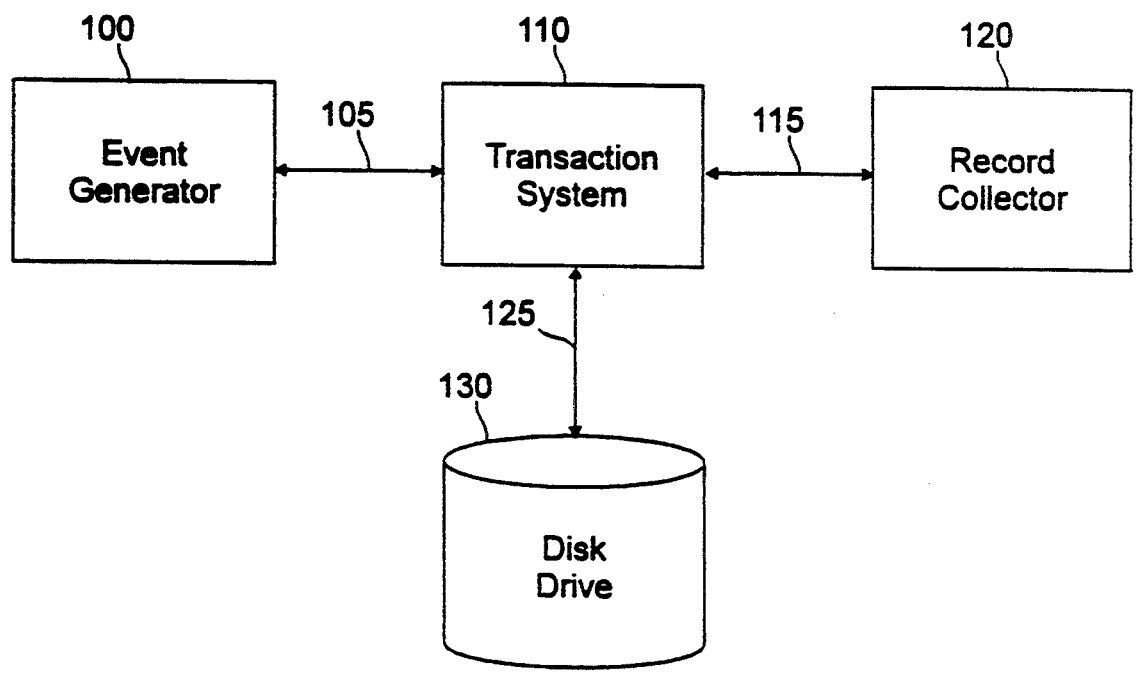
FIG. 1 is a block diagram of a system including an event generator, a record collector, a disk drive, and a transaction system in accordance with the present invention.

FIG. 1 illustrates a computer transaction system (TS) 110 which operates in conjunction with an event generator (EG) 100, a record collector (RC) 120, and a disk drive 130 to process transactions. The EG 100 is connected to the TS 110 by a communications line represented by line 105. The TS 110 is connected to the RC 120 by a communications line represented by line 115.

A transaction is defined as a group of related events generated over time. When all related events are received by the TS 110, they are processed as a unit to produce a record for the transaction. Thus, during the lifetime of each transaction, a series of several events containing raw data related to the transaction are produced by the EG 100 and received by the TS 110. The first event in the series is called the initiating event, and the last one the terminating event. At the receipt of the terminating event, a record for the transaction is generated by the TS 110 from information contained in the events which are related to that transaction. The records for different transactions are sent by the TS 110 to the record collector 120 which then processes the records for other purposes. A nonvolatile storage medium, such as the disk drive 130, is connected to the TS 110 to store information in the case of a failure of the TS 110. The connection between the TS 110 and the disk drive 130 is represented by line 125. The disk drive 130 is shown in more detail in FIG. 3, and will be described in more detail below.

Multiple transactions can be simultaneously active and so the TS 110 is concurrently receiving events related to different transactions. A high-capacity real-time transaction system such as TS 110 must format a large number of records from a large number of events with minimum latency. The primary function of the TS 110 is to receive events from the EG 100, assemble the events so that they are related to their transactions, format a record for a transaction when the terminating event for the transaction has been received, and send the records to the RC 120.

The TS 110 communicates with the EG 100 and the RC 120 to confirm the transfer of data. When the EG 100 sends events to the TS 110, the TS 110 will send a confirmation back to the EG 100 confirming the successful receipt of the events. When the TS 110 sends records to the RC 120, the RC 120 will send a confirmation back to the TS 110 to confirm the successful receipt of the records. The timing of these confirmations are used in conjunction with the present data integrity technique, and will be described in further detail below.

Figure 2:
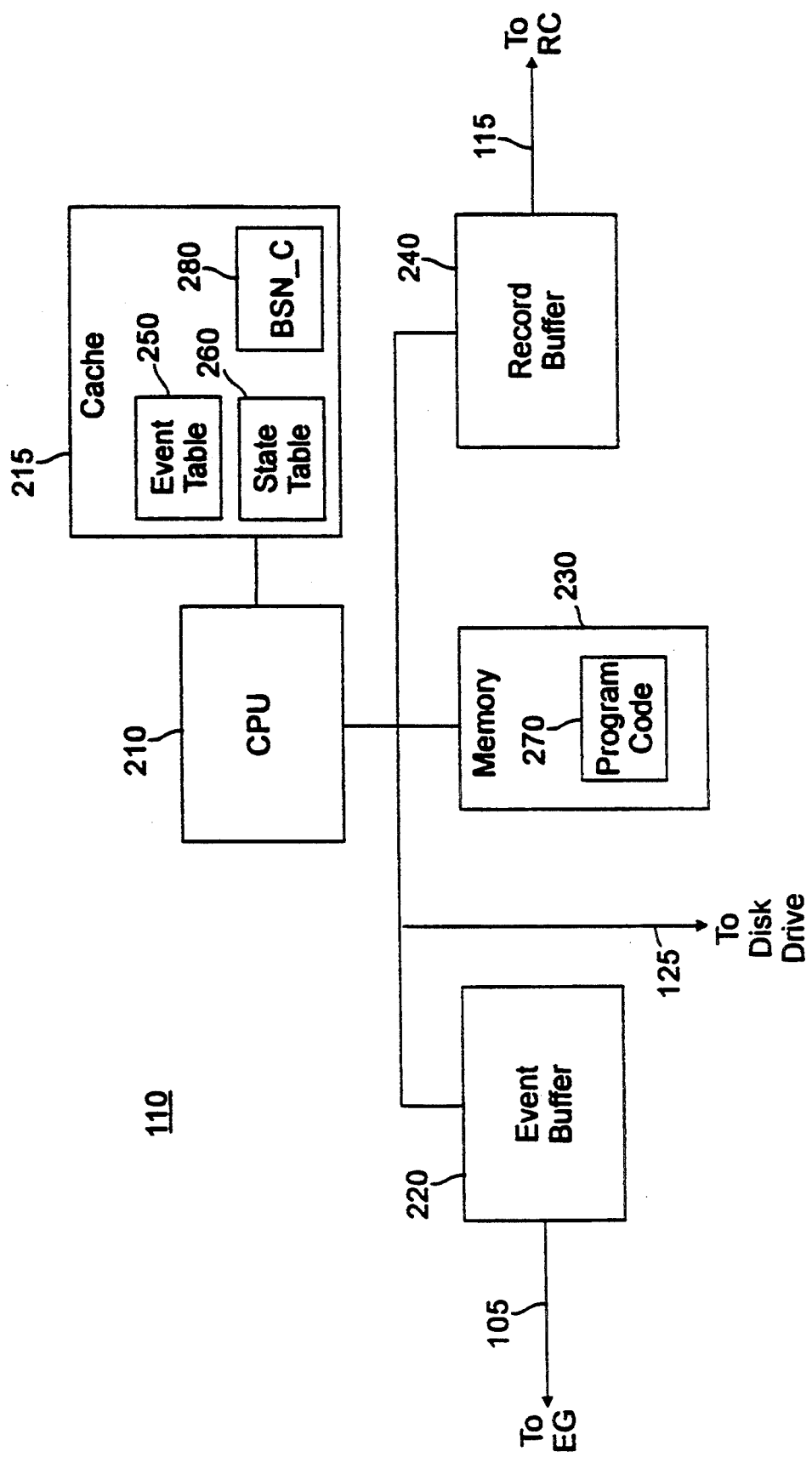
FIG. 2 is a block diagram of the transaction system shown in FIG. 1.

The transaction system 110 is shown in more detail in FIG. 2. The transaction system 110 contains a central processing unit 210 which controls the various functions of the TS 110 by execution of computer program code 270 stored in a memory unit 230. The CPU 210 is connected to an event buffer 220, the memory unit 230, and a record buffer 240. The CPU is connected to a cache memory 215 which contains a state table 260, an event table 250, and a block sequence number counter (BSN_C) 280. In the preferred embodiment shown in FIG. 2, the event table 250, the state table 260 and the BSN_C 280 are stored in cache memory 215 to reduce system latency. However, these tables 250, 260, and 280 could also be stored in the memory unit 230.

Figure 4:
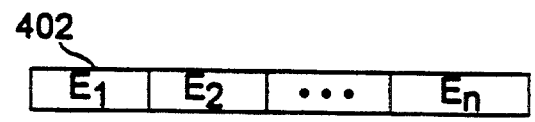
FIG. 4 illustrates a message which is generated by the event generator.

As discussed above, the EG 100 generates events and transmits them to the TS 110. A plurality of events are generally grouped together and transmitted as a message. A message 402 is shown in FIG. 4 and is made up of one or more variable-sized events, shown as $E_1$, $E_2$, ... $E_n$. Each of the events, $E_1$, $E_2$, ... $E_n$ of a message 402 may be related to different transactions. It is noted here that in the event of a TS 110 failure, the new events generated by the EG 100 are stored in the EG 100 instead of being transmitted to the TS 110. Upon recovery of the TS 110, the stored events are sent to TS 110 from EG 100 such that the order of event generation is maintained.

All messages received by the TS 110 from the EG 100 are initially stored in the event buffer 220 and a copy of each of the events is stored on the disk 130. The events are then processed and stored in the event table 250 as described in detail below. When all events that were stored in the event buffer 220 are stored in the event table 250, the event buffer 220 is then ready to receive new events from the EG 100. The disk 130 is organized into segments, shown in FIG. 3 as $S_1$, $S_2$, ... $S_m$. In one embodiment, the size of each of these segments is the same size as the maximum size of a message received from the EG 100. For example, if the maximum size of a message is 16 kilobytes, then each disk segment is 16 kilobytes. When a message is received by the TS 110, a free disk segment must be located. The method of locating a free disk segment will be discussed below. At this point, for purposes of discussion, assume that segment $S_1$ has been identified as a free disk segment.

Figure 3:
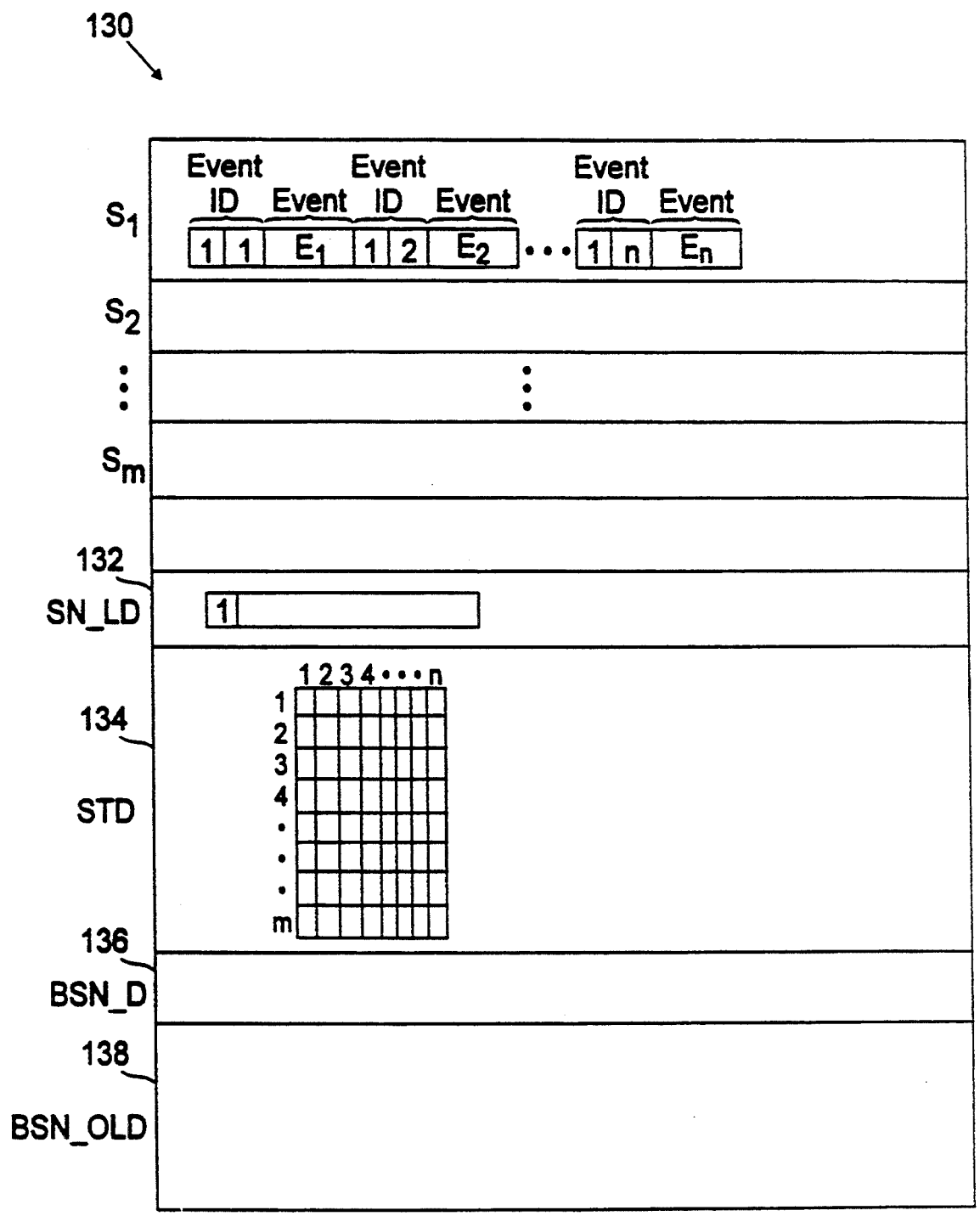
FIG. 3 illustrates the internal organization of the disk drive shown in FIG. 1.

Each event in the received message 402 is assigned an Event ID = {segment number, event number}, where the segment number is an identification of the segment number on the disk 130 in which the event will be saved, and the event number identifies the sequence number of the event within the disk segment. Thus, assuming segment $S_1$ is being used to store the message 402, each event will be assigned an Event ID with the segment number = 1 to indicate the events are being stored on disk segment $S_1$. Each event $E_1$, $E_2$, ... $E_n$ within message 402, along with the event's associated Event ID is then stored on the disk 130 in the assigned segment. Thus, the events $E_1$, $E_2$, ... $E_n$ will be stored in segment $S_1$ as shown in FIG. 3. Note that as shown in FIG. 3, the segment number has been stored on disk as part of the Event ID. However, this is not necessary in actual implementation because the segment number may be implied by the physical location of the event within the disk. As shown in FIG. 3, all Event ID's stored in segment $S_1$ contain a segment number of 1. Thus, in order to save disk space, the segment number would not be stored on the disk, but would be implied by an event's physical location.

As shown in FIG. 3, another storage area on the disk 130 is the segment number list on disk (SN_LD) 132. The SN_LD 132 is used to record the order of the messages/events as they are received by the TS 110 from the EG 100. The SN_LD 132 contains a list of the segment numbers of the disk segments which are assigned to the successive incoming messages from the EG 100. Therefore, in the present example, 1 is stored in the first location in the SN_LD 132 to indicate that the first message is stored in segment $S_1$. After the message is stored on the disk 130, the segment number is stored in the SN_LD 132, and the state table 260 and STD 134 have been updated (the updating of the state table 260 and the STD 134 is described in detail below), a confirmation is sent to the EG 100 from the TS 100 confirming that the message was received. When the next message is received and a free disk segment is allocated for the storage of its events, that segment number will be stored in the next location in the SN_LD 132. This procedure continues for all messages received by the TS 110.

In addition to storing the events on disk 130, the events are processed by the TS 110. Each of the events $E_1, E_2, \ldots E_n$ of a message may be related to different transactions. When a message is received by the TS 110 from the EG 100, the events along with their event IDs are stored in the event table 250 in the cache memory 215. The event table 250 is shown in more detail in FIG. 5. The event table 250 stores the events related to transactions which have been initiated but not yet terminated. For example, when an initiating event $E_1$ is received by the TS 110 for transaction $T_1$ an area 251 in the event table 250 is used to store the initiating event $E_1$, its Event ID, and all subsequent events and Event IDs related to transaction $T_1$. For each transaction $T_2$ through $T_p$, the events and Event IDs related to each of the transactions will be stored in the appropriate area of the event table 250. These events will be stored in the event table 250 until a terminating event is received and a record is formatted for the transaction. The creation of records for terminated transactions will be discussed below.

The state table 260 in the cache memory 215 of the TS 110 keeps track of the state of each of the events stored in the event table 250 and on the disk 130. Periodically, the entire contents of the state table 260 is written into an area on disk 130 called the state table on disk (STD) 134 (FIG. 3) By writing the state table 260 to disk 130, the states of the various events can be recovered from the disk 130 in the event of a TS 110 failure. The state table 260 is shown in more detail in FIG. 6. Each row of the state table 260 represents a segment number of disk 130. Each column of the state table 260 represents the event number within the disk segment. Thus, there is a one-to-one mapping between entries in the state table 260 and events stored on the disk 130. Further, since an Event ID = {segment number, event number}, it can be seen that each Event ID defines an entry in the state table 260, where the segment number represents the row and the event number represents the column in the state table 260. For example, the third sequential event stored in the fifth disk segment would have an event ID = {5,3} and its state would be found in the state table 260 at row 5, column 3.

State table 260 entries contain the following values:

0 = free, i.e., the event with the corresponding Event ID has been disposed, or no event has been assigned to the corresponding Event ID; or 1 = the Event ID has been assigned to an event and the event has not been disposed.

An event is disposed, as the term is used herein, when its associated transaction has been terminated, a record has been formatted, the record has been sent to the RC 120, and an acknowledgment has been received by the TC 110 from the RC 120. In this discussion, it is assumed that there is only one record generated per transaction. However, in a variation of the described embodiment, it is possible that multiple records can be generated for one transaction. In such a case, additional state values may need to be defined. The operation of the system is otherwise similar in the case of multiple records per transaction.

As discussed above, a disk segment must be allocated each time a new message is received from the EG 100. It is essential that, upon a message arrival from the EG 100, a free disk segment can be located quickly so as not to hold up the acknowledgement to be returned to the EG 100. A disk segment is considered free and hence can be over-written by a new message only if it has not been written before, or all the events which had previously been written to that segment have been disposed. Note that in the latter case, the segment number of the segment with all events disposed will be removed from SN_LD 132.

A method of locating a free disk segment is to associate two counters in cache memory 215 with each disk segment. One counter is associated with the state table 260, and the other counter is associated with the STD 134. At the time when a disk segment is assigned to a message, both counters are set to the total number of bytes used to store the events in the message. As an event is disposed and after the state table 260 has been updated, the counter associated with the state table 260 is decremented by the size of the event. At STD 134 update time, the contents of the counter associated with the state table 260 replaces that of the counter associated with the STD 134. When the counter associated with the STD 134 has a zero value, the corresponding segment number is removed from the SN_LD 132, and this signifies that the disk segment is free. As an alternative, instead of counting the number of bytes used, the counters can be used to count the number of events that have not been disposed.

Figure 6:
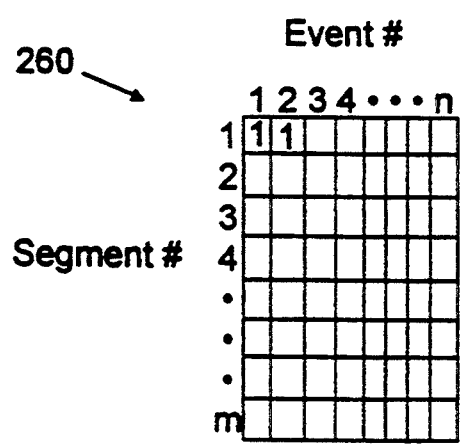
FIG. 6 shows the structure of the state table shown in FIG. 2 which is suitable for storing the state of events in accordance with the present invention.

Thus, the process when each message, such as message 402, arrives at the TS 110 from the EG 100 is as follows. The message 402 will arrive into the event buffer 220, which is a temporary storage area for the received messages. A free disk segment is located. Each event $E_1, E_2, \ldots E_n$ in the message 402 is assigned an appropriate Event ID. These events, together with the assigned Event ID's, are written into the allocated free disk segment. As discussed above, these events are stored on the disk 130 in segment $S_1$, as shown in FIG. 3. The state values for these Event ID's in the state table 260 are set to 1. Thus, the entries in state table 260 which are associated with events $E_1$ and $E_2$ are set to 1. As discussed above, event $E_1$ has an Event ID of {1,1} and event $E_2$ has an Event ID of {1,2}. Therefore, the entries in the state table 260 at {row 1, column 1}, and {row 1, column 2} are set to 1 as shown in FIG. 6. The corresponding entries in STD 134 are also set to 1. Thus, upon the storage of events in the disk 130, the state values for the associated Event ID's in both the state table 260 and the STD 134 are set to one. Note that this is not the same as the periodic updating of the STD 134. Upon the storage of events on the disk 130, only the corresponding entries in the STD 134 are set to one, as contrasted with the periodic updating of the STD 134 where the entire contents of the state table 260 are written to the STD 134. The allocated free disk segment into which the events were stored is added to the SN_LD 132 as discussed above. Acknowledgement for the message 402 can then be sent to the EG 100. This process continues for each message received from the EG 100.

Figure 5:
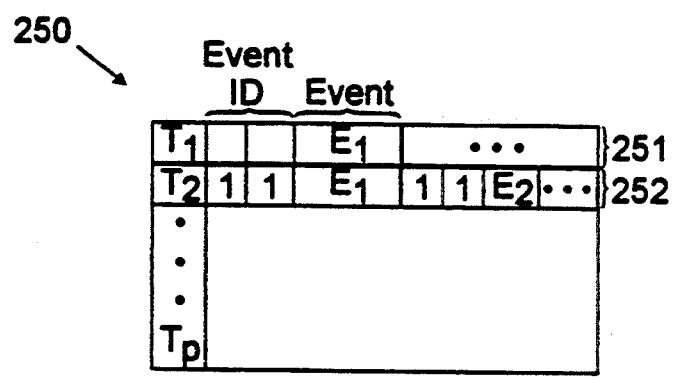
FIG. 5 shows the structure of the event table shown in FIG. 2 which is suitable for storing the relationship between events and transactions in accordance with the present invention.

As a message, such as message 402, is received by the TS 110, the events contained in the message are processed sequentially. The events are written into the event table 250 and organized according to transaction. For example, assume event $E_1$ of message 402 is the initiating event for transaction $T_2$. In such a case, event $E_1$ would be stored in the event table 250 in section 252 as shown in FIG. 5. If event $E_2$ of message 402 was also an event related to transaction $T_2$, then it would also be stored in section 252 of event table 250 as shown. In this manner, the event table 250 keeps track of all the currently pending transactions, i.e., transactions for which an initiating event has been received but not a terminating event. When all events contained in a message are stored in the event table 250, the event buffer 220 is ready to receive another message. Upon receipt of a terminating event, a transaction has terminated and a record will be generated for the transaction. The events related to the terminated transaction are formatted into a record. The record is then ready to be sent to the RC 120. There may be transactions which are made up of only 1 event. These single event transactions are processed the same as multiple event transactions except that the initiating event and terminating event are the same. Also, single event transactions can be formatted into records immediately without the need to store the associated events in the event table 250.

Formatted records are first sent to a record buffer 240, where they are stored for a certain time period. When either a pre-defined timer has expired or the number of records accumulated in the record buffer 240 has reached a pre-defined threshold, the records are sent to the RC 120 as a block. When the RC 120 receives a block of records, it generates an acknowledgement and sends it to the TS 110. Upon receipt of this acknowledgement, the state table 260 is updated to reflect that the events which were part of the terminated transactions have been disposed. Thus, all entries in the state table 260 corresponding to the Event IDs of the disposed events are set to 0. The STD 134 is not updated each time an event is disposed. Instead, the STD 134 is updated periodically to reflect the disposal of events. This is done by periodically saving the state table 260 to the STD 134.

For transactions with long durations, their events will stay in both the event table 250 and the allocated disk segment for a long time. To minimize fragmentation of the disk space, some type of garbage collection process may need to be run periodically to collect these events together. For example, when the number of free disk segments drops below a certain threshold, the garbage collection process can be scheduled to run only during periods of low processor utilization. The garbage collection process may be of any suitable type which can be readily implemented by one skilled in the art. As discussed previously, one choice for disk segment size is the maximum size of a message received by the TS 110. However, the smaller the segment size, the smaller the probability for a segment to contain the events of a long call, and therefore, the lesser the need for a garbage collection process to run. Thus, if under normal conditions, EG message sizes are much smaller than the maximum, then, the chosen segment size should be small to avoid fragmentation.

If the above procedures are followed, any data lost as a result of a failure of the TS 110 can be reconstructed. The reconstruction procedure is described below.

Upon recovery from a failure, the STD 134 and the SN_LD 132 are read from the disk 130. The STD 132 is used to reconstruct the state table 260 in cache memory 215. The SN_LD 132 will contain an ordered list of segment numbers in which messages received from the EG 100 were stored prior to the failure. The first allocated disk segment is read from the SN_LD 132 and the events and associated Event IDs are read from that disk segment. For each event in that segment, the corresponding entry in the state table 260, as reconstructed from the STD 132, is examined. If the entry contains a 0, it indicates that the event had been disposed prior to the failure, and thus there is no need to continue processing the event, and the event can be discarded. It is safe to discard any event with a state of 0 because as discussed above, the state of an event in the state table 260 is not set to 0 until acknowledgement is received from the RC 120 that the record associated with the event has been received. Thus, any event with a state of 0 has been fully processed into a record and the record has been sent to and confirmed by the RC 120. If the entry in the state table 260 is a 1, then the corresponding event had not been disposed of prior to the failure, and the event is processed and placed in the corresponding location in the event table 250.

The process continues until all the events in the disk segment have been processed in this way. After all events in a disk segment are processed, the next disk segment is read from the SN_LD 132 to determine the next segment which was used to store a message from the EG 100. All events from this disk segment are then processed as described above. This process continues until all events have been read from the disk segments.

During the above described recovery process of reading events from the disk 130, the events are processed in the same way as they were processed when they were received by the TS 110 during normal processing. Thus, upon recovery from a total failure of the TS 110, it is possible to reconstruct, from the events saved on disk, all those records that had not been disposed according to the STD 134 as last updated prior to the failure. Due to periodic updating, the STD 134 state information may lag behind the state information contained in the state table 260 at the point of failure. As a result, duplicate records may be produced upon recovery. A post-recovery procedure is therefore needed to remove these duplicates.

One post recovery method for the removal of duplicate records is through the use of a block sequence number (BSN). Each record block which is sent to the RC 120 is assigned a BSN at the time when the block is formatted and ready to be sent to the RC 120. These BSN's are assigned sequentially, with the value obtained from BSN_C 280. BSN_C 280 is initially set to 1. Thus, the first record block sent to the RC 120 would be assigned a BSN of 1. Each time a record block is assigned a BSN, the BSN_C 280 is incremented by one. Thus, the second record block sent to the RC 120 would be assigned a BSN of 2. Each time the receipt of a record block is confirmed by the RC 120, the BSN for the confirmed record block is stored in the block sequence number on disk (BSN_D) 136. At the time of periodic updating of the STD 134, the current value contained in the BSN D 136 is stored in BSN_OLD 138. Subsequent to this STD 134 updating, as record blocks are being disposed, the BSN_D 136 is updated to contain the BSN of the most recently disposed of record block. In effect, each time a record block is disposed, the BSN_D 136 is incremented by one. At the time of a failure, BSN-D 136 will contain the BSN of the last record block actually sent to and confirmed by the RC 120, whereas BSN-OLD 138 will contain the BSN of the last record block sent to and confirmed by the RC 120 as reflected in the STD 134. Thus, by Comparing BSN_D 136 and BSN_OLD 138, it is possible to identify and remove the post recovery duplicate records. After recovery, BSN_C 280 is set to the value of BSN_OLD 138 plus one.

The above duplicate removal procedure assumes that record blocks are sequentially acknowledged by the RC 120. In the situation in which the protocol between TS 110 and RC 120 operates with non-sequential acknowledgements, multiple equivalents of the BSN_D 136 may be used to keep track of the disposed record blocks. Other than multiple BSN_D locations, the principle of the procedure is the same as described above in connection with sequential acknowledgements, and the procedure could be readily implemented by one skilled in the art.

The above technique will remove all duplicate records generated as a result of the failure of the TS 110. Specifically, it will remove all duplicates generated for those records that are considered disposed by TS 110. However, one failure scenario is as follows. The TS 110 has made a transfer of record blocks to the RC 120. The RC 120 then returns an acknowledgement to the TS 110. The TS 110 fails just before it receives this acknowledgement. Under this circumstance, the record blocks have not yet been disposed. The BSN values of these record blocks will not be reflected in BSN_D 136. Upon recovery, the TS 110 will therefore not recognize them as duplicates. In this case, duplicate removal will need to be done by the RC 120 in the protocol between the TS 110 and RC 120.

Figure 7:
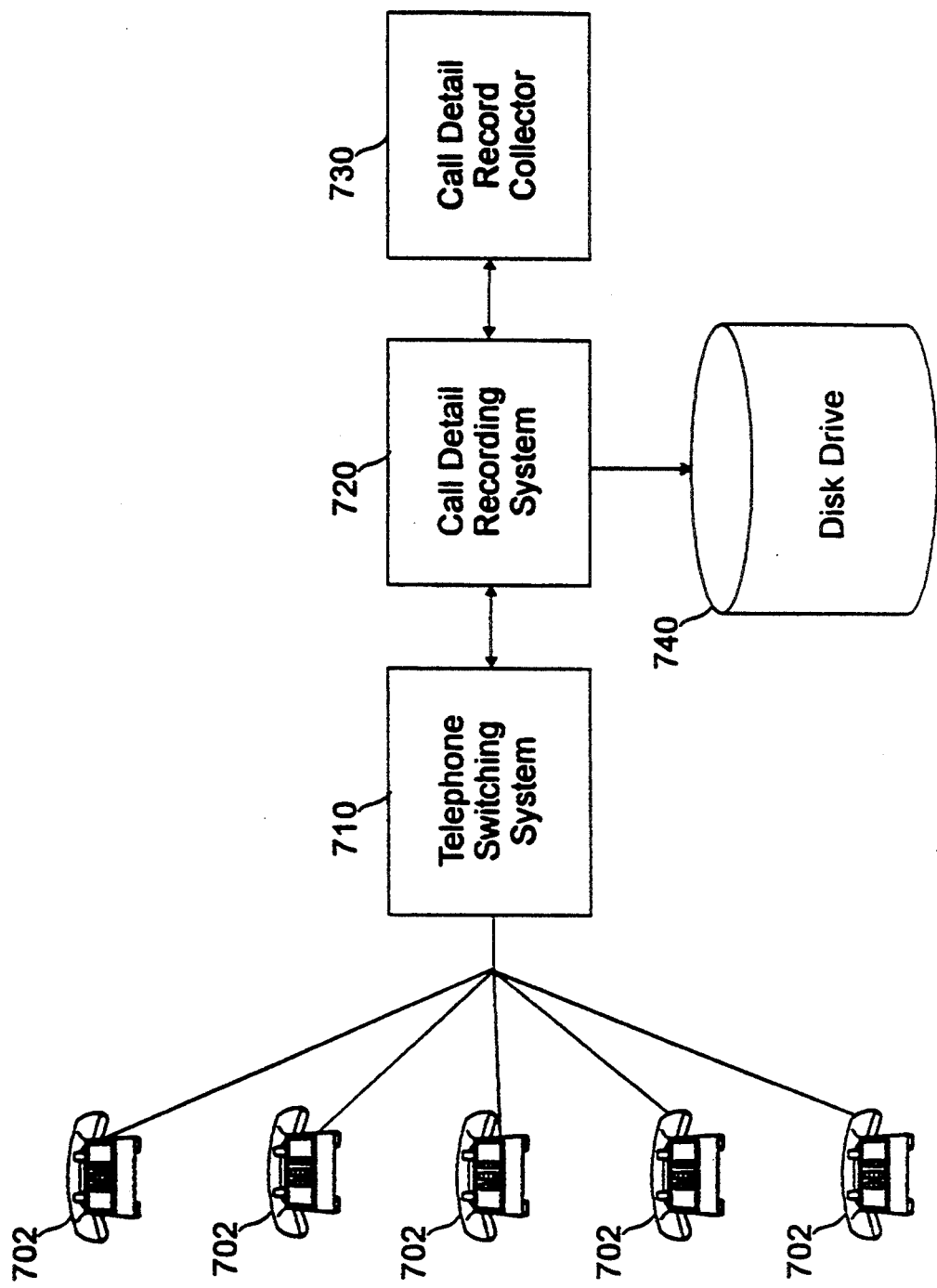
FIG. 7 shows an embodiment of a transaction system in accordance with the present invention in a telecommunications system.

In one embodiment, a transaction system in accordance with the present invention may be used in a telecommunications system in which telephone calls are processed, as shown in FIG. 7. Telephone calls are made from various telephone locations, 702. As a call is being established, details about the call (such as source and destination number, call type, call duration, etc.) are generated by a telephone switching system 710. Each of the calls is a transaction and the details of each call are the events. The telephone switching system 710 generates events and sends them to the call detail recording system 720. The call detail recording system 720 processes the events related to each call, formats the events into records, and sends the records to a call detail record collector 730. A disk drive 740 is connected to the call detail recording system 720. In this embodiment, the telephone switching system 710 operates as the EG 100, the call detail recording system 720 operates as the TS 110, and the call detail record collector 730 operates as the RC 120, as described above in conjunction with FIGS. 1-6.

It is to be understood that the embodiments and variations shown and described herein are illustrative of the principles of this invention only and that various modifications may be implemented by those skilled in the art without departing from the scope and spirit of the invention.

We claim:

1. A zero defect transaction system for processing a plurality of events having a relationship to a plurality of transactions, wherein each transaction is comprised of at least one event, the system comprising:
   a central processing unit;
   a memory unit connected to said central processing unit;
   an event table stored in said memory unit for storage of information defining a relationship between events and transactions;
   a nonvolatile storage device connected to said central processing unit;
   means for storing events and event identifications in segments of said nonvolatile storage device, wherein each of said event identifications comprises a sequence number of an event within a segment;
   means for generating records for transactions, wherein the events related to transactions for which records have been generated are considered disposed;
   a state table stored in said memory unit for storage of status indicia, wherein said status indicia indicates whether or not said event has been disposed;
   means for periodically storing said state table in said nonvolatile storage device; and
   means for reconstructing said event table and said state table in said memory unit from information stored on said nonvolatile storage device in the event of a failure of the zero defect transaction system.

2. The system of claim 1 wherein said memory unit is a cache memory.

3. The system of claim 1 wherein said event identifications further comprise an identification of a segment in said nonvolatile storage device in which the event is stored.

4. The system of claim 1 wherein said nonvolatile storage device is a disk drive having a plurality of disk segments.

5. The system of claim 1 further comprising:
   an event buffer connected to said central processing unit; and
   a record buffer connected to said central processing unit.

6. The system of claim 4 further comprising:
   means for identifying a free disk segment to be used for storage of events and event identifications.

7. The system of claim 6 wherein said means for identifying a free disk segment to be used for the storage of events and event identifications further comprises:
   a plurality of counters, each of said counters associated with one of said plurality of disk segments;
   means for incrementing one of said plurality of counters when the one of said plurality of disk segments associated with that counter is used for the storage of events;

means for decrementing one of said plurality of counters when an event which was stored in the segment associated with that counter is disposed; and means for identifying a free segment when a counter associated with a segment contains a zero value.

8. A zero defect computer transaction system for processing a plurality of events having a relationship to a plurality of transactions comprising:

a central processing unit;

a memory unit connected to said central processing unit, said memory unit comprising an event table and a state table;

a nonvolatile storage device having a plurality of segments connected to said central processing unit;

means for receiving a message from an event generator, said message comprising a plurality of events;

means for storing said plurality of events in a segment of said nonvolatile storage device;

means for storing an event identification for each stored event in said nonvolatile storage device, said event identification comprising a first part and a second part, said first part identifying the segment of the nonvolatile storage device in which the event is stored, and said second part identifying the sequence number within said segment in which the event is stored;

means for storing events and event identifications in an event-table in said memory unit, said event table representing the relationship between events and transactions;

means for generating a record for a transaction when all events related to the transaction have been received;

means for storing a status indicia for each received event in a state-table-in-memory in said memory unit, said status indicia indicating whether a record has been generated for the transaction related to each received event;

means for periodically storing said state-table-in-memory in a nonvolatile-state-table in the nonvolatile storage device; and means for recovering from a transaction system failure by using the information stored in the nonvolatile storage device.

9. The system of claim 8 wherein said memory unit is a cache memory.

10. The system of claim 8 further comprising:

means for generating records during recovery from a transaction system failure; and means for preventing the generation of duplicate records during recovery from a transaction system failure.

11. The system of claim 10 wherein said means for preventing the generation of duplicate records during recovery from a transaction system failure further comprises:

means for transmitting a plurality of record blocks to a record collector, wherein each of said plurality of record blocks comprises a plurality of records;

means for assigning a block sequence number to each of said plurality of record blocks;

means for storing in a first location of said nonvolatile storage device the block sequence number of each of said plurality of record blocks;

means for storing in a second location of said nonvolatile storage device the block sequence number contained in said first location each time said state-table-in-memory is stored in the nonvolatile-state-table; and means for calculating a difference of the block sequence numbers in said first and second locations during recovery from a transaction system failure, wherein said difference represents a number of duplicate record blocks for which generation is to be prevented.

12. The system of claim 11 further comprising:

means for receiving from said record collector a confirmation that a record block has been received; and means for storing in said first location of said nonvolatile storage device the block sequence number of each transmitted record block only after said confirmation has been received.

13. The system of claim 8 wherein said means for recovering from a transaction system failure further comprises:

means for reading the nonvolatile-state-table and storing it in the state-table-in-memory;

means for reading a plurality of events and event identifications from a segment of said nonvolatile storage device;

means for determining, from the status indicia stored in the state-table-in-memory, whether a record has been generated for a transaction having a relationship to each of said plurality of events read from said segment; and means for storing an event in the event table only if a record has not been generated for the transaction related to the event.

14. The system of claim 8 further comprising:

means for generating a confirmation to the event generator that said message was received after events in said message are stored in a segment of said nonvolatile storage device.

15. The system of claim 8 wherein said nonvolatile-state-table further comprises a plurality of rows and a plurality of columns, wherein each of said plurality of rows of said nonvolatile-state-table represents one of said plurality of segments of said nonvolatile storage device and wherein each of said plurality of columns of said nonvolatile-state-table represents each of said plurality of events stored in said plurality of segments.

16. The system of claim 8 wherein said state-table-in-memory further comprises a plurality of rows and a plurality of columns, wherein each of said plurality of rows of said state-table-in-memory represents one of said plurality of segments of said nonvolatile storage device and wherein each of said plurality of columns of said state-table-in-memory represents each of said plurality of events stored in said plurality of segments.

17. The system of claim 8 further comprising:

means for storing in said nonvolatile storage device a sequential order of identifications of segments used to store events received from the event generator.

18. A method for obtaining zero defect data integrity in a computer transaction system, wherein said computer transaction system comprises a central processing unit, a memory unit, and a nonvolatile storage device, the method comprising the steps:

receiving a message from an event generator, said message comprising a plurality of events having a relationship to a plurality of transactions;

identifying a free segment in said nonvolatile storage device;

storing said plurality of events in said free segment in said nonvolatile storage device;

storing said events in an event table in said memory unit, said event table containing information identifying a relationship between events and transactions;

generating a record for a transaction when all events related to said transaction have been received;

storing a status indicia for each event in a state-table-in-memory in said memory unit, wherein said status indicia indicates whether a record has been generated for the transaction related to the event; and storing said state-table-in-memory in a nonvolatile-state-table in said nonvolatile storage device.

19. The method of claim 18 further comprising the steps of:

generating an event identification for each one of said plurality of events in said message, said event identification identifying said free segment and sequence of said each one of said plurality of events within the message; and storing said event identifications in said event table.

20. The method of claim 18 wherein said memory unit is a cache memory.

21. The method of claim 18 further comprising the step of recovering from a transaction system failure.

22. The method of claim 21 wherein the step of recovering from a transaction system failure further comprises the steps of:

reading the nonvolatile-state-table from the nonvolatile storage device and storing it in the state-table-in-memory;

reading events from a segment of said nonvolatile storage device;

determining, from the status indicia stored in the state-table-in-memory, whether a record has been generated for the transactions which are related to the events read from said segment; and storing an event in the event table only if a record has not been generated for the transaction related to the event.

23. The method of claim 21 further comprising the steps:

generating records during recovery from a transaction system failure; and preventing the generation of duplicate records during recovery from a transaction system failure.

24. The method of claim 23 wherein said step of preventing the generation of duplicate records during recovery from a transaction system failure further comprises the steps:

transmitting a plurality of records to a record collector, wherein said plurality of records define a record block;

assigning a block sequence number to each of said record blocks;

storing in a first location of said nonvolatile storage device the block sequence number of each transmitted record block;

storing in a second location of said nonvolatile storage device the block sequence number contained in said first location each time said state-table-in-memory is stored in the nonvolatile-state-table; and calculating a difference of the block sequence numbers in said first and second locations during recovery from a transaction system failure, wherein said difference represents a number of duplicate record blocks for which generation is to be prevented.

25. The method of claim 24 further comprising the steps:

receiving from said record collector a confirmation that said record block has been received; and storing in said first location of said nonvolatile storage device the block sequence number of each transmitted record block only after said confirmation has been received.

26. The method of claim 18 further comprising the step:

generating a confirmation to the event generator that said message was received after events in said message are stored in a segment of said nonvolatile storage device.

27. The method of claim 18 further comprising the step:

storing a segment number list on said nonvolatile storage device, wherein said segment number list comprises a sequential list of nonvolatile storage device segments used to store events and event identifications.

28. The method of claim 18 wherein said nonvolatile storage device is a disk drive.

29. The method of claim 18 wherein the step of identifying a free segment in said nonvolatile storage device further comprises the steps:

incrementing a counter associated with a segment when that segment is used for storing of an event;

decrementing a counter associated with a segment when a record has been generated for a transaction related an event which is stored in that segment; and identifying a segment as free when a counter associated with the segment contains a zero value.

30. A method for processing a plurality of events related to a plurality of transactions in a transactional computer system, wherein said transactional computer system comprises a central processing unit, a memory unit connected to said central processing unit, and a nonvolatile storage device connected to said central processing unit, the method comprising the steps:

receiving an initiating event from an event generator, wherein said initiating event initiates a first transaction;

locating a first free storage segment in said nonvolatile storage device;

storing said initiating event in said first free storage segment of said nonvolatile storage device;

transmitting a confirmation to said event generator after said initiating event is stored in said nonvolatile storage device;

storing said initiating event in an event table in said memory unit, said event table storing structural information associating said initiating event with said first transaction;

storing a status indicia for said initiating event in a state table in said nonvolatile storage device, said status indicia indicating that said initiating event is pending;

receiving a terminating event for said first transaction;

locating a second free storage segment in said nonvolatile storage device;

storing said terminating event in said second free storage segment of said nonvolatile storage device;

transmitting a confirmation to said event generator after said terminating event is stored in said nonvolatile storage device;

storing said terminating event in said event table;

storing a status indicia for said terminating event in said state table, said status indicia indicating that said terminating event is pending;

generating a record for said first transaction upon receipt of said terminating event;

transmitting said record to a record collector; and updating the status indicia of said initiating event and said terminating event in said state table after said record has been generated, said status indicia indicating that said initiating event and said terminating event have been disposed.

31. The method of claim 30 wherein said memory unit is a cache memory.

32. The method of claim 30 further comprising the steps:

receiving an intermediate event related to said first transaction;

locating a third free storage segment in said nonvolatile storage device;

storing said intermediate event in said third free segment of said nonvolatile storage device;

storing said intermediate event in said event table; and storing a status indicia for said intermediate event in said state table, said status indicia indicating that said intermediate event is pending.

33. The method of claim 32 further comprising the step:

storing identifications of storage segments used for storage of events in a segment number list on said nonvolatile storage device, wherein said segment number list comprises a sequential list of said storage segments used for storage of events.

34. The method of claim 33 further comprising the step of recovering from a transaction system failure occuring at a time.

35. The method of claim 34 wherein said step of recovering from a transaction system failure further comprises the steps of:

reading said segment number list from the nonvolatile storage device;

reading events from said nonvolatile storage device; and recreating said event table as it existed at the time t of the transaction system failure.

36. The method of claim 35 wherein the step of recreating the event table as it existed at the time t of the transaction system failure further comprises the steps of:

reading said state table from the nonvolatile storage device;

determining whether a record has been generated for each of the events read from the nonvolatile storage device; and storing each of the events read from the nonvolatile storage device in the event table only if a record has not been generated for transaction related to the event.

37. The method of claim 30 further comprising the step:

storing an identification of said first and second free storage segments in a segment number list on said nonvolatile storage device.

* * * * *